US007365772B2

(12) United States Patent
Mizutani et al.

(10) Patent No.: US 7,365,772 B2
(45) Date of Patent: Apr. 29, 2008

(54) COMMUNICATION METHOD AND MONITORING CAMERA SYSTEM

(75) Inventors: Aritaka Mizutani, Osaka (JP); Kei Tanimura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 771 days.

(21) Appl. No.: 10/266,127

(22) Filed: Oct. 8, 2002

(65) Prior Publication Data

US 2003/0095190 A1    May 22, 2003

(30) Foreign Application Priority Data

Oct. 11, 2001 (JP) ............................. 2001-313702
Oct. 12, 2001 (JP) ............................. 2001-315634

(51) Int. Cl.
H04N 5/232 (2006.01)
H04N 7/18 (2006.01)

(52) U.S. Cl. .................................. 348/211.5; 348/159

(58) Field of Classification Search ................ 348/143, 348/153, 159, 207.1, 207.11, 211.3, 211.5, 348/211.11, 211.13
See application file for complete search history.

(56) References Cited

U.S. PATENT DOCUMENTS 5,867,484 A * 2/1999 Shaunfield ............. 370/395.51

FOREIGN PATENT DOCUMENTS

JP 06-284323 A 10/1994
JP 2001-268550 A 9/2001

OTHER PUBLICATIONS

Notice of Rejection dated Aug. 2, 2006 issued with respect to corresponding Japanese Patent Application No. 2001-315634.

* cited by examiner

Primary Examiner—David Ometz
Assistant Examiner—Justin P Misleh
(74) Attorney, Agent, or Firm—Westerman, Hattori, Daniels & Adrian, LLP.

(57) ABSTRACT

A monitoring camera system including a plurality of monitoring cameras, a plurality of monitors, a multiplexer for switching a connection between the monitoring camera and the monitor, and a plurality of controllers for remotely controlling the monitoring cameras through a communication control line. Each of the controllers remotely control the monitoring cameras by sending to the communication control line a command including an address assigned to the monitoring camera which is a control object and the contents of control. In controlling a monitoring camera providing video to a predetermined monitor, a controller sends a number of the predetermined monitor to the multiplexer, and inquires of the multiplexer about the address assigned to the monitoring camera providing the video to the predetermined monitor. The multiplexer transmits the address assigned to the monitoring camera providing the video to the predetermined monitor to the controller that is a source of the inquiry.

4 Claims, 5 Drawing Sheets

COMMUNICATION METHOD AND MONITORING CAMERA SYSTEM

BACKGROUND OF THE INVENTION

1. Field of the Invention

The present invention relates to a communication system comprising a camera device and a communication device connected to the camera device through a cable, the communication device superimposing communication data on each of a predetermined number of (a plurality of) continuous horizontal lines (vertical blanking periods) of a video signal sent to the cable from the camera device to transmit the communication data to a camera. Furthermore, the present invention relates to a monitoring camera system.

2. Description of the Prior Art (1) In a monitoring camera system comprising a monitoring camera and a communication device such as a controller, communication between the monitoring camera and the communication device is established on the basis of RS-485 (EIA (Electronic Industries Association) 6485 Standard). In such a monitoring camera system, the monitoring camera and the communication device are connected to each other through a communication control line based on RS-485.

The communication device sends a command including an address assigned to the monitoring camera to be controlled and the contents of control to the communication control line based on RS-485, so that the monitoring camera having the designated address is remotely controlled.

In such a monitoring system, video imaged by the monitoring camera is recorded on a VTR and is displayed on a monitor. Accordingly, a device for recording and displaying the video and the monitoring camera are connected to each other through a video signal transmission cable (a coaxial cable) Therefore, it is necessary to also wire the communication control line based on RS-485 in addition to the video signal transmission cable.

Therefore, a method of superimposing communication data on a coaxial cable, to reduce the length of the wiring of the communication control line based on RS-485 has already been developed. In this case, however, it is necessary to superimpose communication data on a predetermined horizontal period in a vertical blanking period of a video signal, whereby a delay occurs. Accordingly, the method may not be adaptable to an RS-485 communication protocol. Consequently, communication control must be carried out by a system using an independent protocol different from the RS-485 communication protocol.

An object of the present invention is to provide a communication method in which the length of the wiring of a communication control line based on RS-485 can be reduced by superimposing communication data on a coaxial cable, and communication can be established without changing an RS-485 communication protocol.

[2] Known as a monitoring camera system is one comprising a plurality of monitoring cameras 1_1 to 1_m, a plurality of spot monitors 2_1 to 2_4, a multiplexer 3 for switching the connection between the monitoring camera 1 and the monitor 2, and a plurality of controllers 4_1 to 4_4.

Each of the controllers 4_1 to 4_4 is connected to the multiplexer 3 and each of the monitoring cameras 1_1 to 1_m by a communication control line 5 based on RS-485 (EIA6485 Standard).

Each of the monitoring cameras 1_1 to 1_m, the multiplexer 3, and each of the controllers 4_1 to 4_4 are respectively assigned individual addresses (IDs). The address is set by a dip switch provided in each device, for example.

Each of the controllers 4_1 to 4_4 sends a command including the address assigned to the device to be controlled and the contents of control to the communication control line 5 based on RS-485, so that the device having the designated address is controlled.

When it is desired to remotely control from the first controller 4_1 the monitoring camera providing video to the first spot monitor 2_1, the command including the address assigned to the monitoring camera and the contents of control must be transmitted to the communication control line 5 based on RS-485 from the first controller 4_1. For this purpose, an operator of the first controller 4_1 must examine which of the monitoring cameras provides the video to the first spot monitor 2_1, to confirm the address assigned to the monitoring camera providing the video to the first spot monitor 2_1.

An object of the present invention is to provide a monitoring camera system that eliminates, when a monitoring camera providing video to a predetermined monitor is remotely controlled, the need for an operator to confirm an address assigned to the monitoring camera.

SUMMARY OF THE INVENTION

A communication method according to the present invention is a communication method in a communication system in which a communication device is connected to a camera through a control bus based on RS-485, a first coaxial conversion device, a video signal transmission cable, and a second coaxial conversion device, a first coaxial conversion device comprising the function of superimposing communication data from the communication device to the camera on a vertical blanking period of a video signal on the video signal transmission cable and the function of extracting communication data from the camera to the communication device which is superimposed on the video signal on the video signal transmission cable to transmit the extracted communication data to the control bus based on RS-485, and the second coaxial conversion device comprising the function of superimposing communication data from the camera to the communication device on a vertical blanking period of a video signal on the video signal transmission cable and the function of extracting communication data from the communication device to the camera which is superimposed on the video signal on the video signal transmission cable to transmit the extracted communication data to the camera, which is characterized in that in a case where each of the coaxial conversion devices superimposes the communication data on the video signal, the communication data corresponding to one byte per field is superimposed on the video signal. After initial communication is established, the number of continuous transmission commands continuously transmitted without any confirmation code is restricted to not more than a predetermined number.

In a monitoring camera system comprising a plurality of monitoring cameras, a plurality of monitors, a multiplexer for switching the connection between the monitoring camera and the monitor, and a plurality of controllers for remotely controlling the monitoring camera through a communication control line, each of the controllers sending, in remotely controlling the monitoring camera, a command including an address assigned to the monitoring camera which is a control object and the contents of control to the communication control line, a first monitoring camera system according to the present invention is characterized in that each of the controllers comprises means for sending, in controlling the monitoring camera providing video to the predetermined monitor, the number of the monitor to the multiplexer, and inquiring of the multiplexer about the address assigned to the monitoring camera providing the video to the monitor, and the multiplexer comprises a monitor number-camera channel table storing the relationship between the number of the monitor and a channel through which the monitoring camera is connected to the monitor (hereinafter referred to as a camera channel), a camera channel-camera address table storing the relationship between the camera channel and the address assigned to the monitoring camera connected to the camera channel, and means for reading out, when it receives from the controller the inquiry about the address assigned to the monitoring camera with the monitor number, the address assigned to the monitoring camera providing the video to the monitor corresponding to the received monitor number from the monitor number-camera channel table and the camera channel-camera address table, and transmitting the read address to the controller which is a source of the inquiry.

In a monitoring camera system comprising a plurality of monitoring cameras, a plurality of monitors, a multiplexer for switching the connection between the monitoring camera and the monitor, and a plurality of controllers for remotely controlling the monitoring camera through a communication control line, each of the controllers sending, in remotely controlling the monitoring camera, a command including an address assigned to the monitoring camera which is a control object and the contents of control to the communication control line, a second monitoring camera system according to the present invention is characterized in that each of the controllers comprises means for inquiring, in controlling the monitoring camera providing video to the monitor previously determined for the controller, of the multiplexer about the address assigned to the monitoring camera providing the video to the monitor, and the multiplexer comprises a controller address-monitor number table storing the relationship between the address assigned to each of the controllers and the number of the monitor corresponding thereto, a monitor number-camera channel table storing the relationship between the number of the monitor and a channel through which the monitoring camera is connected to the monitor (hereinafter referred to as a camera channel), a camera channel-camera address table storing the relationship between the camera channel and the address assigned to the monitoring camera connected to the camera channel, and means for reading out, when it receives from the controller the inquiry about the address assigned to the monitoring camera, the address assigned to the monitoring camera providing the video to the monitor corresponding to the controller which is a source of the inquiry from the controller address-monitor number table, the monitor number-camera channel table, and the camera channel-camera address table, and transmitting the read address to the controller which is the source of the inquiry.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
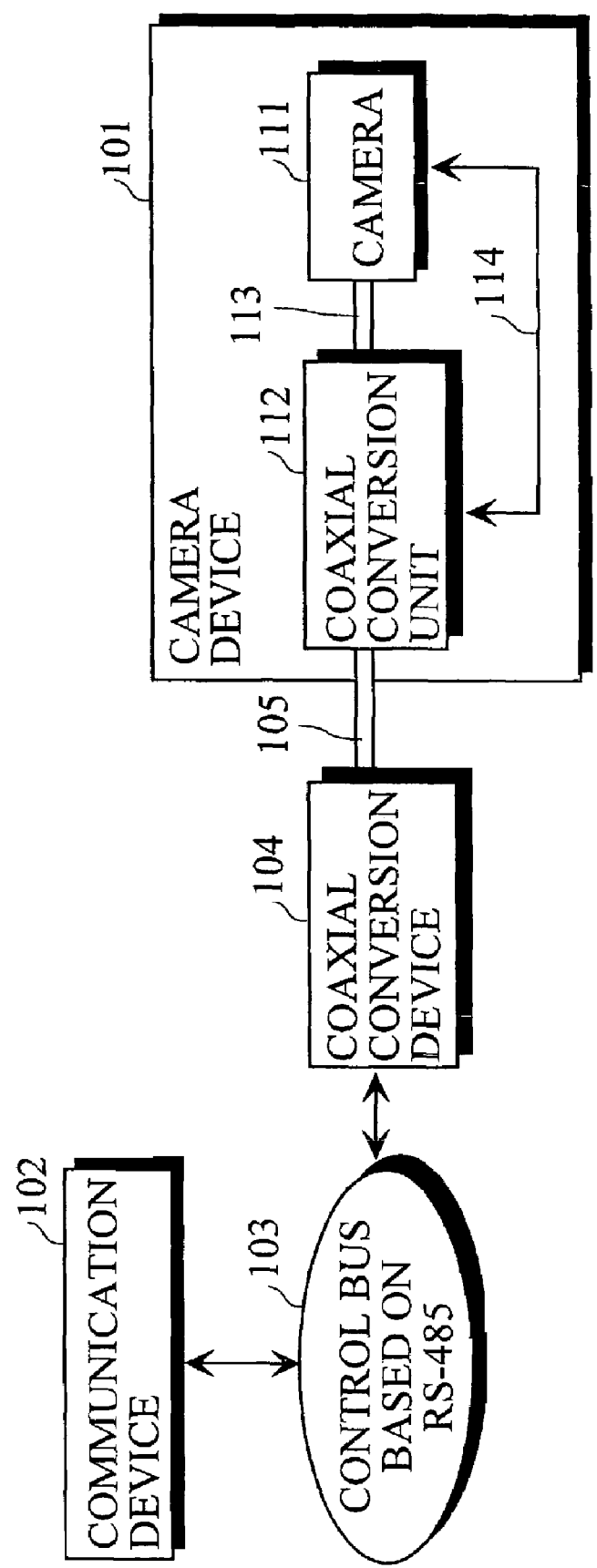
FIG. 1 is a block diagram showing a communication system between a camera device and a communication device such as a controller.

Referring now to the drawings, an embodiment of the present invention will be described.

[A] Description of Embodiment of Invention Related to Communication Method

FIG. 1 illustrates a communication system between a camera device and a communication device such as a controller.

A camera device 101 comprises a camera (a monitoring camera) 111 and a coaxial conversion unit (a second coaxial conversion device) 112. The camera (monitoring camera) 111 and the coaxial conversion unit 112 are connected to each other by a coaxial cable 113, and are connected to each other by a communication control line 114 based on RS-485.

A communication device 102 such as a controller is connected to a control bus 103 based on RS-485. A coaxial conversion device (a first coaxial conversion device) 104 is connected to the control bus 103. The coaxial conversion device 104 is connected to the coaxial conversion unit 112 inside the camera device 101 by a coaxial cable (a video signal transmission cable) 105.

The coaxial conversion unit 112 inside the camera device 101 comprises functions such as the function of superimposing communication data to be transmitted to the communication device 102 on a predetermined horizontal period in a vertical blanking period of a video signal from the camera 111 to send the communication data to the coaxial cable 105 and the function of extracting communication data sent from the communication device 102 through the coaxial conversion device 104 and the coaxial cable 105. The communication data extracted by the coaxial conversion unit 112 is sent to the camera 111 through the communication control line 114.

The coaxial conversion device 104 comprises functions such as the function of superimposing communication data sent from the communication device 102 through the control bus 103 on a predetermined horizontal period in a vertical blanking period of a video signal on the coaxial cable 105 and the function of extracting communication data sent from the camera device 101 through the coaxial cable 105 to send the extracted communication data to the control bus 103.

Meanwhile, in an RS-485 communication protocol, it is determined that command bytes are spaced not less than 15 msec apart from each other on the transmission side, and the maximum waiting time period is 100 msec in the receiving wait state.

The present embodiment is characterized in that the coaxial conversion device 104 and the coaxial conversion unit 112 are operated such that communication conforming to the RS-485 communication protocol is established.

In order to establish the communication conforming to the RS-485 communication protocol, the following regulations are carried out in the present embodiment.

(1) The coaxial conversion device 104 and the coaxial conversion unit 112 superimpose, in superimposing communication data on a video signal, communication data corresponding to one byte (one command) on one field.

(2) After initial communication is established, the number of continuous transmission commands continuously transmitted without any confirmation code is restricted to not more than a predetermined number.

Figure 2:
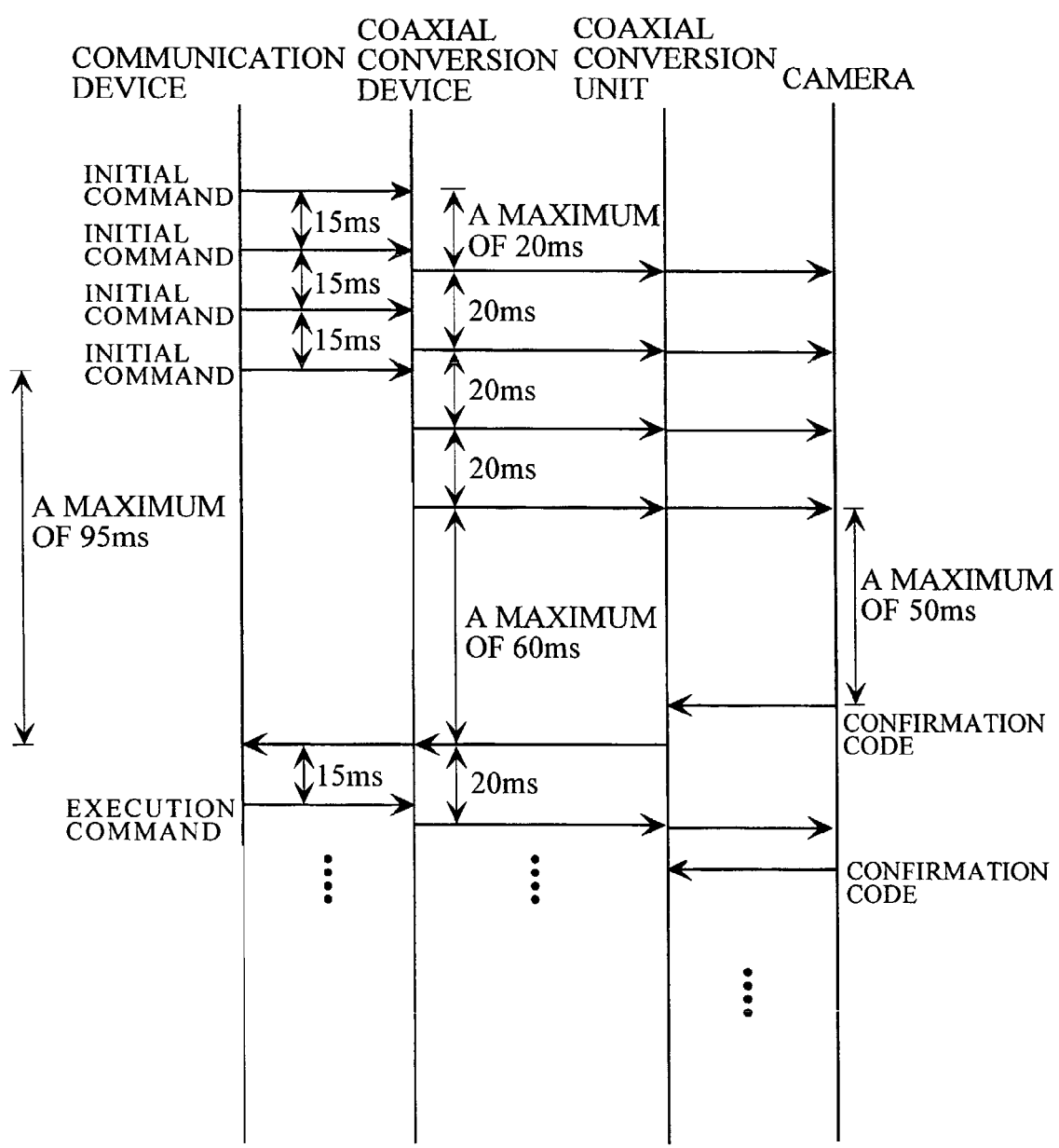
FIG. 2 is a sequence diagram showing the procedure for communication between a communication device 102 and a camera device 101.

FIG. 2 shows the procedure for communication between the communication device 102 and the camera device 101.

When the communication device 102 sends communication data to the control bus 103, communication data (initial commands) corresponding to four bytes are continuously transmitted at intervals of 15 msec in the initial communication. The communication data (initial commands) are sent to the coaxial conversion device 104 through the control bus 103. The initial commands corresponding to two bytes in the first half indicate an address at a source of transmission, and the initial commands corresponding to two bytes in the latter half indicate an address at a destination of transmission.

The coaxial conversion device 104 superimposes, every time it receives the initial command corresponding to one byte, the received initial command on a predetermined horizontal period in a vertical blanking period of a video signal. As described above, the initial command corresponding to one byte is superimposed on one field. Accordingly, the initial commands corresponding to four bytes are superimposed over four fields.

When each of the initial commands is superimposed on the video signal, a delay occurs by the synchronous timing of the video signal. Herein, assuming that the video signal is a video signal conforming to a PAL (Programmable Array Logic) system, the vertical synchronous period is 20 msec. When the first initial command corresponding to one byte is superimposed on the video signal, therefore, a delay of a maximum of 20 msec occurs. Further, when the second to fourth initial commands are superimposed on the video signal, the initial commands are superimposed at intervals of 20 msec irrespective of the fact that they are sent at intervals of 15 msec. Accordingly, a delay of 5 msec occurs for each of the commands. Consequently, a delay of a maximum of 35 msec occurs until the initial commands corresponding to four bytes reach the camera device 101.

The camera 111 in the camera device 101 transmits a confirmation code to the coaxial conversion unit 112 when the address at the destination of transmission included in the initial commands coincides with an address assigned to its own. A time period elapsed from the time when the camera 111 receives the last initial command until it sends the confirmation code to the coaxial conversion unit 112 is generally 15 msec and a maximum of 50 msec. Even if the time period is 50 msec, the coaxial conversion unit 112 can superimpose the confirmation command on the video signal before the subsequent vertical period is started. Accordingly, a confirmation signal can be sent to the communication device 102 through the coaxial cable 105, the coaxial conversion device 104, and the control bus 103 after an elapse of 60 msec (=20 msec×3) since the last initial command was received.

Therefore, it is possible to ensure an RS-485 communication protocol prescribing that a time period elapsed form the time when the communication device 102 which is a source of transmission transmits all the initial commands until it receives the confirmation code is a maximum of 95 msec (=35 msec+60 msec), and the maximum waiting time period is 100 msec in the receiving wait state. Although description was made of a case where the delay is the maximum, a time period elapsed from the time when the communication device 102 which is the source of transmission transmits all the initial commands until it receives the confirmation code is generally about 50 to 60 msec.

After the initial communication is established, an execution command is transmitted, as shown in FIG. 2. Since the number of continuous transmission commands continuously transmitted without any confirmation code is restricted to not more than four, for example, however, a confirmation code corresponding to the last one of the continuous transmission commands is sent before 100 msec has elapsed. Therefore, it is possible to ensure the RS-485 communication protocol prescribing that the maximum waiting time period is 100 msec in the receiving wait state.

When the video signal is not a video signal conforming to a PAL system but a video signal conforming to an NTSC (National Television System Standard Committee) system, the vertical synchronous period thereof is shorter than that of the video signal conforming to the PAL system, whereby the delay is further shortened. Therefore, it is possible to ensure the RS-485 communication protocol.

Although description was made of a case where the communication data is issued to the camera device 101 from the communication device 102, the same is true for a case where the communication data is issued to the communication device 102 form the camera device.

According to the above-mentioned embodiment, the length of the wiring of the communication control line based on RS-485 can be reduced by superimposing the communication data on the coaxial cable, and the communication can be established without changing the RS-485 communication protocol.

[B] Description of Embodiments of Invention Related to Monitoring Camera System

[1] Description of First Embodiment

Figure 3:
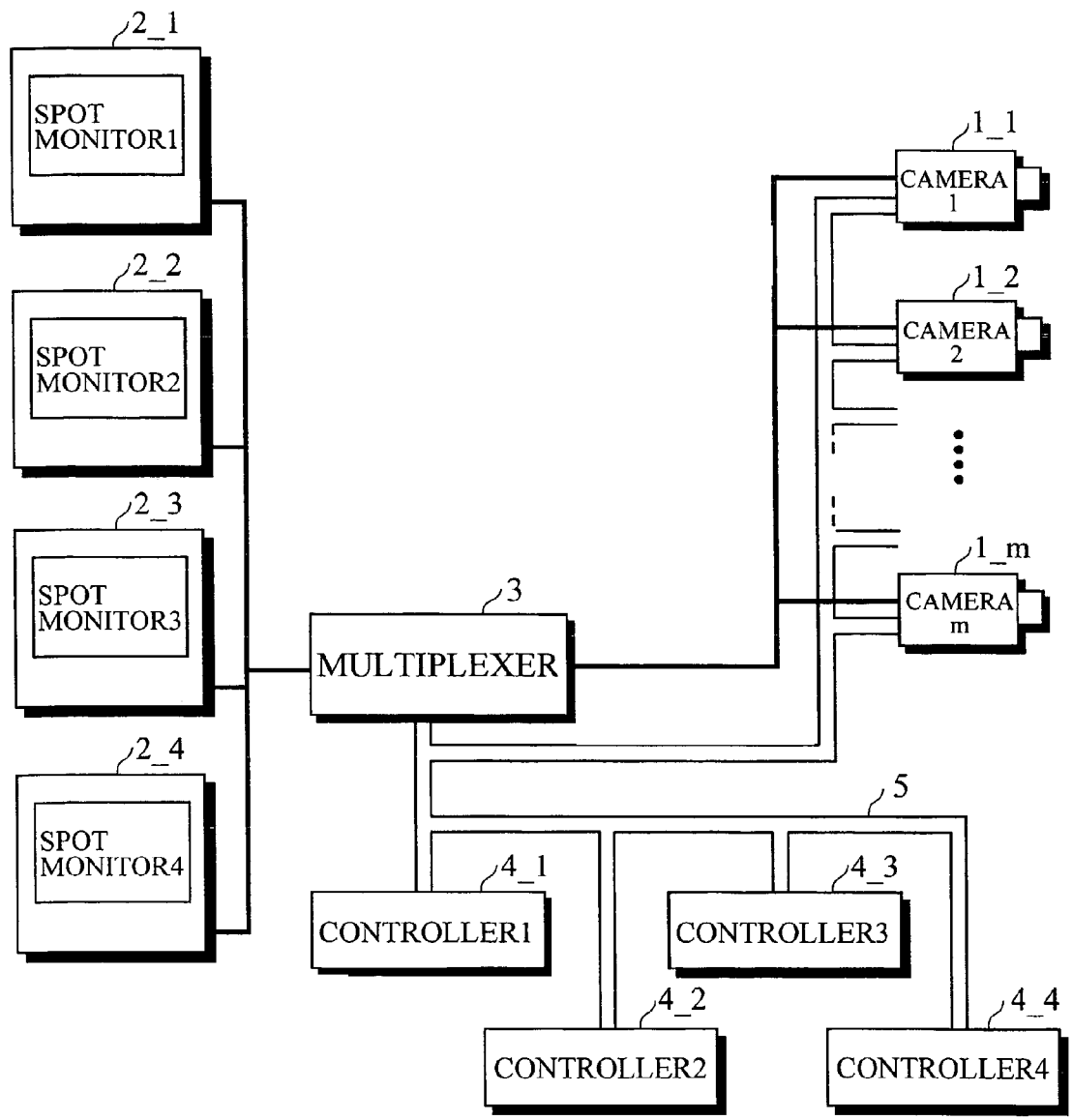
FIG. 3 is a block diagram showing the configuration of a monitoring camera system.

FIG. 3 illustrates the configuration of a monitoring camera system.

The monitoring camera system comprises a plurality of monitoring cameras 1_1 to 1_m, a plurality of spot monitors 2_1 to 2_4, a multiplexer 3 for switching the connection between the monitoring camera 1 and the monitor 2, and a plurality of controllers 4_1 to 4_4.

Each of the controllers 4_1 to 4_4 is connected to the multiplexer 3 and each of the monitoring cameras 1_1 to 1_m by a communication control line 5 based on RS-485 (EIA6485 Standard).

Each of the monitoring cameras 1_1 to 1_m, the multiplexer 3, and each of the controllers 4_1 to 4_4 are respectively assigned individual addresses (IDs).

Each of camera connection terminals in the multiplexer 3 is assigned a camera channel number. Each of monitor connection terminals in the multiplexer 3 is assigned a monitor channel number. The multiplexer 3 comprehends which of the camera channels is connected to each of the monitor channels, and holds a monitor number-camera channel table storing the relationship between the monitor channel (the monitor number) and the camera channel connected to the monitor channel.

Furthermore, the multiplexer 3 shall hold a camera channel-camera address table storing the relationship between each of the camera channels and the address assigned to the monitoring camera connected to the camera channel.

Figure 4:
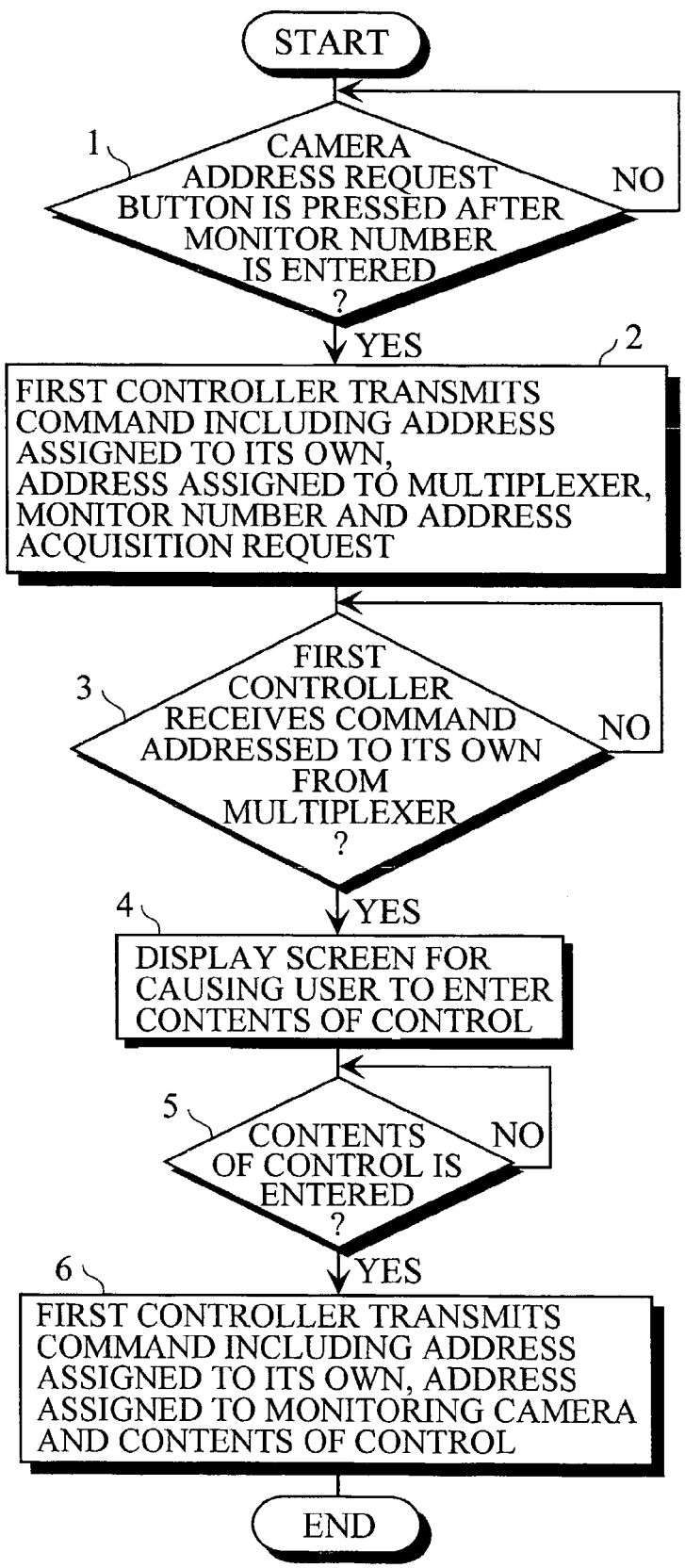
FIG. 4 is a flow chart showing the procedure for processing according to a first embodiment in a case where a monitoring camera providing video to a predetermined spot monitor is controlled from an arbitrary controller.

FIG. 4 shows the procedure for processing in a case where a monitoring camera providing video to a predetermined spot monitor is controlled from an arbitrary controller.

Here, description is made of the procedure for processing in a case where the monitoring camera providing video to the first spot monitor 2_1 is controlled from the first controller 4_1.

An operator of the first controller 4_1 first enters into the first controller 4_1 the monitor number of the spot monitor (in this example, the first spot monitor 2_1) on which the video provided by the monitoring camera to be controlled is displayed, and then presses a camera address request button for acquiring from the multiplexer 3 the address assigned to the monitoring camera to be controlled.

When the operator presses the camera address request button after entering the monitor number (step 1), the first controller 4_1 transmits to the communication control line 5 a command including an address assigned to its own which is a source of transmission, an address assigned to the multiplexer 3 which is a destination of transmission, the monitor number, and a camera address acquisition request (step 2).

The multiplexer 3 first reads out, when it receives the above-mentioned command addressed to its own form the first controller 4_1, a camera channel corresponding to the received monitor number from the monitor number-camera channel table. A camera address corresponding to the camera channel read out of the monitor number-camera channel table is then read out of the camera channel-camera address table. A command including the obtained camera address and the address assigned to the first controller which is a destination of transmission is transmitted to the communication control line 5.

The first controller 4_1 displays, when it receives the above-mentioned command addressed to its own from the multiplexer 3 (step 3), a screen for causing the operator to enter the contents of control for the monitoring camera (step 4).

When the operator enters the contents of control into the first controller 4_1 on the basis of the display (step 5), the first controller 4_1 transmits to the communication control line 5 a command including the address assigned to its own which is a source of transmission, an address assigned to the monitoring camera which is a destination of transmission (an address assigned to the camera, which is a control object, acquired from the multiplexer 3), and the contents of control entered by the operator (step 6).

The monitoring camera having the address at the destination of transmission in the command transmitted by the first controller 4_1 performs, when it receives the above-mentioned command, an operation in accordance with the contents of control included in the command. Consequently, the monitoring camera providing the video to the first spot monitor 2_1 is remotely controlled.

[2] Description of Second Embodiment

The configuration of a monitoring camera system is the same as that shown in FIG. 3.

In the second embodiment, a one-to-one correspondence is previously established between controllers 4_1 to 4_4 and spot monitors 2_1 to 2_4, as in a case where one set of a controller and a monitor is arranged in each of four rooms.

Therefore, it is previously determined which monitoring camera providing video to each of the spot monitors 2_1 to 2_4 is controlled by each of the controllers 4_1 to 4_4. The multiplexer 3 holds a controller address-monitor number table storing the relationship between an address assigned to the controller and the monitor number in addition to a monitor number-camera channel table and a camera channel-camera address table.

Figure 5:
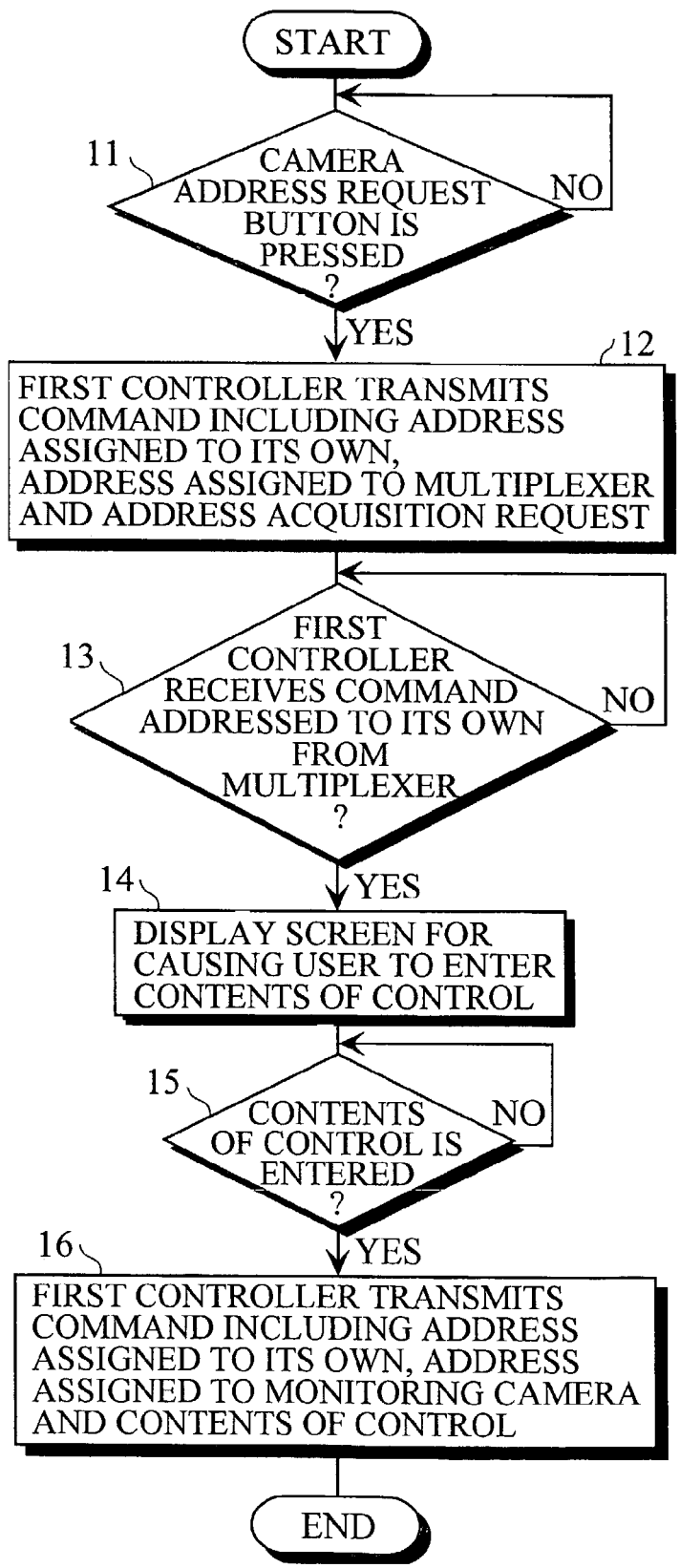
FIG. 5 is a flow chart showing the procedure for processing according to a second embodiment in a case where a monitoring camera providing video to a predetermined spot monitor is controlled from an arbitrary controller.

FIG. 5 shows the procedure for processing in a case where a monitoring camera providing video to a predetermined spot monitor is controlled from an arbitrary controller.

Description is herein made of the procedure for processing in a case where the monitoring camera providing video to the first spot monitor 2_1 from the first controller 4_1 is controlled.

An operator of the first controller 4_1 presses a camera address request button for acquiring from the multiplexer 3 an address assigned to the monitoring camera to be controlled.

When the operator presses the camera address request button (step 11), the first controller 4_1 transmits to a communication control line 5 a command including an address assigned to its won which is a source of transmission, an address assigned to the multiplexer which is a destination of transmission, and a camera address acquisition request (step 12).

The multiplexer 3 first reads out, when it receives the above-mentioned command addressed to its own from the first controller 4_1, a monitor number corresponding to the address at the source of transmission included in the received command from the controller address-monitor number table. A camera channel corresponding to the monitor number read out of the controller address-monitor number table is then read out of the monitor number-camera channel table. A camera address corresponding to the camera channel read out of the monitor number-camera channel table is then read out of the camera channel-camera address table. A command including the obtained camera address and the address assigned to the first controller which is a destination of transmission is transmitted to the communication control line 5.

The first controller 4_1 displays, when it receives the above-mentioned command addressed to its own from the multiplexer 3 (step 13), a screen for causing the operator to enter the contents of control for the monitoring camera (step 14).

When the operator enters the contents of control into the first controller 4_1 on the basis of the display (step 15), the first controller 4_1 transmits to the communication control line 5 a command including the address assigned to its own which is a source of transmission, an address assigned to the monitoring camera which is a destination of transmission (an address assigned to the camera, which is a control object, acquired from the multiplexer 3), and the contents of control entered by the operator (step 16).

The monitoring camera having the address at the destination of transmission in the command transmitted by the first controller 4_1 performs, when it receives the above-mentioned command, an operation in accordance with the contents of control included in the command. Consequently, the monitoring camera providing the video to the first spot monitor 2_1 is remotely controlled.

According to the above-mentioned embodiment, when the monitoring camera providing the video to the predetermined monitor is remotely controlled, the operator need not confirm the address assigned to the monitoring camera.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A monitoring camera system, comprising:
a plurality of monitoring cameras;
a plurality of monitors;
a multiplexer for switching a connection between a monitoring camera and a monitor; and
a plurality of controllers for remotely controlling said plurality of monitoring cameras through a communication control line, each of the controllers sending, in remotely controlling a monitoring camera, a command including an address assigned to the monitoring camera which is a control object and contents of control to the communication control line,
wherein each of the controllers comprises means for sending, in controlling a monitoring camera providing video to a predetermined monitor, a number of the predetermined monitor to the multiplexer, and inquiring of the multiplexer about the address assigned to the monitoring camera providing the video to the predetermined monitor, and means for sending out the command including the address assigned to the monitoring camera and the contents of control to the communication control line when the address assigned to the monitoring camera is transmitted from the multiplexer in response to the inquiry, thereby to control the monitoring camera; and
the multiplexer comprises a monitor number-camera channel table storing a relationship between the number of the monitor and a camera channel through which the monitoring camera is connected to the monitor, a camera channel-camera address table storing a relationship between the camera channel and the address assigned to the monitoring camera connected to the camera channel, and means for reading out, when it receives from the controller the inquiry about the address assigned to the monitoring camera with the monitor number, the address assigned to the monitoring camera providing the video to the monitor corresponding to the received monitor number from the monitor number-camera channel table and the camera channel-camera address table, and transmitting the read address to the controller which is a source of the inquiry.

2. The monitoring camera system according to claim 1, wherein said communication control line is a communication control line based on RS-485.

3. A monitoring camera system, comprising:
a plurality of monitoring cameras;
a plurality of monitors; a multiplexer for switching a connection between a monitoring camera and a monitor; and
a plurality of controllers for remotely controlling said monitoring camera through a communication control line, each of the controllers sending, in remotely controlling the monitoring camera, a command including an address assigned to the monitoring camera which is a control object and contents of control to the communication control line, the monitoring camera system,
wherein each of the controllers comprises means for inquiring, in controlling the monitoring camera providing video to a monitor previously determined for the controller, of the multiplexer about the address assigned to the monitoring camera providing the video to the monitor, and means for sending out the command including the address assigned to the monitoring camera and the contents of control to the communication control line when the address assigned to the monitoring camera is transmitted from the multiplexer in response to the inquiry, thereby to control the monitoring camera; and
the multiplexer comprises a controller address-monitor number table storing the relationship between the address assigned to each of the controllers and the number of the monitor corresponding thereto, a monitor number-camera channel table storing the relationship between the number of the monitor and a camera channel through which the monitoring camera is connected to the monitor, a camera channel-camera address table storing the relationship between the camera channel and the address assigned to the monitoring camera connected to the camera channel, and means for reading out, when it receives from the controller the inquiry about the address assigned to the monitoring camera, the address assigned to the monitoring camera providing the video to the monitor corresponding to the controller which is a source of the inquiry from the controller address-monitor number table, the monitor number-camera channel table, and the camera channel-camera address table, and transmitting the read address to the controller which is the source of the inquiry.

4. The monitoring camera system according to claim 3, wherein said communication control line is a communication control line based on RS-485.

* * * * *